United States Patent [19]

Taylor et al.

[11] 3,768,972
[45] Oct. 30, 1973

[54] METHOD OF PRODUCING CUBIC BORON NITRIDE WITH ALUMINUM CONTAINING CATALYST

[75] Inventors: Abraham Taylor; Norman J. Doyle, both of Pittsburgh, Pa.

[73] Assignee: Westinghouse Electric Corporation, Pittsburgh, Pa.

[22] Filed: May 10, 1971

[21] Appl. No.: 142,040

[52] U.S. Cl.................. 23/300, 23/293 R, 23/305, 423/284
[51] Int. Cl......................... B01d 9/00, C01b 21/06
[58] Field of Search.................. 23/300, 305, 293 R, 23/204, 358, 191

[56] References Cited
UNITED STATES PATENTS

| | | | |
|---|---|---|---|
| 2,947,617 | 8/1960 | Wentorf | 23/191 |
| 3,141,802 | 7/1964 | Wentorf | 23/204 |
| 3,150,929 | 9/1964 | Wentorf | 23/191 |
| 3,240,563 | 3/1966 | Mercuri | 23/204 |
| 3,261,667 | 7/1966 | O'Connor | 23/204 |
| 3,411,882 | 11/1968 | Knorre et al | 23/191 |

FOREIGN PATENTS OR APPLICATIONS

| | | | |
|---|---|---|---|
| 250,175 | 2/1964 | Australia | 23/300 |
| 1,131,645 | 6/1962 | Germany | 23/191 |

OTHER PUBLICATIONS

Chem. Abstracts, Vol. 72: 139166p. (1970)

*Primary Examiner*—Norman Yudkoff
*Assistant Examiner*—R. T. Foster
*Attorney*—F. Shapoe and Lee P. Johns

[57] ABSTRACT

An improved method for converting boron nitride from the hexagonal to the cubic form in which powdered hexagonal boron nitride is mixed with at least one catalyst selected from the group consisting of elemental aluminum, and β-phase alloys of nickel and aluminum, and particularly NiAl, CoAl, FeNiAl, CoNiAl, CoCuAl, CuNiAl, FeNiCoAl, CuCoNiAl, and FeCoCuAl, and the mixture compressed at a pressure of from about 60 kilobars to about 85 kilobars and higher while heating to a temperature of from about 800° C to about 1600° C.

6 Claims, No Drawings

METHOD OF PRODUCING CUBIC BORON NITRIDE WITH ALUMINUM CONTAINING CATALYST

BACKGROUND OF THE INVENTION

1. Field of the Invention

This invention relates to a method for converting soft, graphite-like, hexagonal boron nitride to the hard, diamond-like cubic form by the application of high pressure and high temperature in the presence of a catalyst, such as elemental aluminum and δ -phase NiAl alloys, containing large numbers of nickel-site vacancies, whereby abrasive forms of boron nitride are provided. 2. Description of the Prior Art It is well known that a diamond can be synthesized from amorphous carbon or from the hexagonal graphitic form, by using suitable high pressure and high temperature conditions. The processes involved frequently require a catalyst or intermediary material to effect the transformation. Such a catalyst normally consists of a transition metal such as chromium, manganese, iron, nickel, cobalt, tantalum, or alloys thereof which catalyst promotes the transformation when the temperature is sufficiently high to melt the metal in the presence of carbon.

In a manner similar to the production of a diamond it is possible to convert boron nitride from the hexagonal graphitic form to a diamond-like cubic form. It is known, however, that the catalyst materials are quite different and consist essentially of alkali and alkaline earth metals, their nitrides, such as magnesium or $Mg_3N_2$ and antimony, tin, and lead. Some patents disclosing the production of the cubic form of boron nitride include those of one R. A. Wentdorf; namely, U.S. Pat. Nos. 2,947,617, 3,078,232 and 3,141,802. The same patentee also discloses in U.S. Pat. No. 3,150,929 the use of a catalyst selected from the group consisting of actinide and lanthanide metals; namely, thorium, uranium, and lanthanum. In addition, R. A. Wentdorf has patented a method for making preformed cubic boron nitride using a bonding material selected from the group consisting of W, Ni, Be, Re, Ti, Zr, Cr, Co, $Al_2O_3$, BeO, Mo, Mn, and Cu.

The cubic form of boron nitride consists of a nitrogen atom that is located at the center of a tetrahedron whose apices are defined by four boron atoms to which the nitrogen atom is united by a chemical bond. The structural linkage produces an atomic arrangement which is essentially cubic. However, if the tetrahedral units are caused to be linked together in a slightly different arrangement which is equivalent to rotating selected layers of the tetrahedra through 180° at specified intervals around one of the tetrahedral bonds to produce rotation-twins or stacking faults, it is possible to produce an almost infinite variety of structures which while preserving the essential tetrahedral arrangement and packing density of the material result in structure having hexagonal symmetry around the rotation axis. As shown by F. P. Bundy in U.S. Pat. Nos. 3,212,851 and 3,212,852 cubic boron nitride may be converted to hexagonal "wurtzite" form by subjecting the cubic nitride simultaneously to a static pressure of at least about 100 kilobars and to a maximum temperature of 3,600°, and permitting the material to return to the ambient atmospheric condition.

In an article by A. J. Bradley and A. Taylor in Proceedings of the Royal Society, London. Vol. 159, page 56, 1937, alloys in the β phase of the nickel-aluminum system were found to have a cubic CsCl type of structure in which each corner of the elemental cubic cell is occupied by an aluminum atom and the center of each cube is occupied by a nickel atom. The structure displays a remarkable characteristic that whereas, on the nickel-rich side of the stoichiometric NiAl, aluminum atoms are replaced substitutionally by nickel to produce a nickel-rich solid solution, the reverse is not the case on the aluminum-rich side of NiAl. Intead, as the β -phase of NiAl alloys becomes progressively richer in aluminum, vacancies appear at random in the site which would normally be occupied by nickel atoms, i.e., the increase in nickel content of the alloys is really affected by the subtraction of nickel atoms at random from the latter. Thus, at the aluminum-rich phase boundary which occurs at the 54.75 atomic percent aluminum out of every 100 potential nickel sites in the structure, only 84 are filled and the remaining 16 which would normally have been filled with aluminum, had normally substitution occurred are vacant. A similar defect or vacancy structure occurs on the aluminum rich side of the β -CoAl phase. It does not occur in the case of the β -FeAl phase because the aluminum rich boundary occurs at the stoichiometric FeAl composition.

The process of vacancy formation is not confined to the binary alloys of the β -NiAl and β -CoAl type. It also occurs in the ternary β -phases of the Fe-Ni-Al, Co-Ni-Al, Co-Cu-Al, Cu-Ni-Al, as well as in similar systems in the corresponding β -phase quaternary systems such as for exampel Fe-Ni-Co-Al, Cu-Co-Ni-Al, Fe-Co-Cu-Al, and in other corresponding ploynary alloy systems.

SUMMARY OF THE INVENTION

It has been found in accordance with this invention that boron nitride may be converted from a soft hexagonal form to a hard cubic form by mixing hexagonal boron nitride powder with a minor portion of at least one catalyst containing aluminum, which catalyst is selected from the group consisting of elemental aluminum and β -phase alloys of nickel and aluminum and particularly NiAl, CoAl, FeNiAl, CoNiAl, CoCuAl, CuNi:Al, FeNiCoAl, CuCoNiAl, and FeCoCuAl; and compressing the mixture to a pressure of at least 65 kilobars while heating to a temperature of at least about the melting point of the aluminum in the mixture and then permitting the mixture to return to ambient atmospheric conditions. An advantage of this method is that it is an efficient and relatively inexpensive method of producing a diamond-like form of boron nitride having a hardness and resistance to oxidation at high temperatures that are greater than those of a diamond.

DESCRIPTION OF THE PREFERRED EMBODIMENT

The method of the present invention consists in using pure aluminum or aluminum-rich alloys as a catalyst for converting the soft graphitic form of boron nitride to the hard abrasive diamond-like form by a combined high temperature high pressure treatment. Boron nitride in its dehydrated form must be used; the presence of any moisture defeats the reaction. It has been found that although pure boron nitride is convertible to the cubic form in accordance with the method of this invention, the commercial form of boron nitride is preferred because it contains about 10 to 12 percent of adventitious agent such as boron anhydride ($B_2O_3$) and/or boric acid ($H_3BO_3$). The presence of these agents, particularly the boric acid, greatly enhances the reaction because they act as fluxes which thereby enable the aluminum present to proceed more expeditiously than where these agents are not present.

Although the size of the particles of powdered boron nitride is substantially immaterial to the success of the method, good results were obtained when the particle size of the powder ranged from 0.05 micron to 1.0 micron. Larger sizes of particles are also suitable.

As was indicated above, the catalyst for the reaction is aluminum, either pure elemental aluminum or $\beta$-phase aluminum-base alloy or compound. Elemental aluminum is the preferred form for catalyzing the reaction. A mixture of hexagonal boron nitride and aluminum may consist of at least about 95 weight percent of boron nitride and 5 weight percent aluminum. The greater the amount of the aluminum, the more expeditiously the reaction proceeds once it starts and pressures and temperatures at the lower ranges may be used. However, smaller amounts of aluminum may be used satisfactorily, for example, at least 99 weight percent boron nitride and about 1 weight percent aluminum may be used. The preferred mixture consists of 99.5 wt. percent boron nitride and 0.5 wt. percent aluminum, whereby a highly satisfactory reaction occurs at slightly higher pressures and temperatures that would be necessary where larger percentages of aluminum are used. Elemental aluminum having a purity of 99.995 percent in the form of a fine powder about 100 mesh is satisfactory.

Beta phase aluminum-base alloys or compounds may also be used either with or without elemental aluminum present. Examples of binary aluminum-base alloys include NiAl, CoAl as examples of ternary alloys are FeNiAl, CoNiAl, CoCuAl, and CuNiAl. Quaternary aluminum base alloys may be used, for example FeNiCoAl, CuCoNiAl, FeCoCuAl, as well as corresponding polynary alloy systems. All of the foregoing alloys of the binary, ternary, quaternary, and other are preferably $\beta$-phase systems or other systems having higher percentages of aluminum than $\beta$-phases. It has been found that satisfactory results are obtained with the $\beta$-phase alloys whose compositions preferably include those having the indicated lattice vacancy.

Catalytic alloys of the foregoing $\beta$-phase type are prepared by conventional methods of melting and casting in air, vacuum, or inert gas, the melting procedure being effected by known means, such as by high-frequency induction heating, electron beam melting, laser-beam melting, and other conventional methods such as by solid state diffusion. The nickel-aluminum alloy mixtures of aluminum and nickel powders having the requisite mixture ratio to produce the $\beta$-phase alloys are heated to a little above the melting point of the aluminum when the resulting exothermic reaction which occurs between molten aluminum and nickel, causes the nickel to be taken into solution to produce the required alloy. Alternately, the $\beta$-phase nickel aluminum alloy catalyst may be prepared from an alloy whose composition is $Ni_2Al_3$ or NiAl in which the alloy is immersed in a suitable aqueous solution of sodium hydroxide which leaches out sufficient aluminum to leave a residue having the desired $\beta$-NiAl composition.

After washing and drying, the alloy is heated to produce the $\beta$-NiAl structure.

Other aluminum base alloys including aluminum with 4 wt. % copper, aluminum with up to about to about 5 wt. % magnesium, as well as aluminum with up to about 5 wt. % zirconium, are also useful in the practice of this invention.

The pressure at which the mixture is subjected to convert boron nitride to the cubic form may vary from about 60 to 100 or more kilobars. A preferred pressure is from about 65 to 85 kilobars and the optimum is about 78 kilobars. Pressures of less than 65 kilobars could be used, however the reaction would be exceedingly slow unless excessive amounts of aluminum or higher than usual temperatures were present.

The temperature for the reaction is above the melting point of aluminum, and may vary from about 800° to 1,600°C.

A number of tests for converting boron nitride to the cubic form were conducted for various runs using as a catalyst mixtures of $\beta$-NiAl with elemental aluminum at the times, temperatures and pressures listed and the results are listed in the following Table.

TABLE

| Run No. | Time at temperature and pressure | Temperature °C | Pressure kilobars | X-ray film No. | Remarks |
|---|---|---|---|---|---|
| 1 | 5 seconds | 1,500 | 78 | 9905 | Complete transformation to cubic. |
| 3 | 1 second | 1,600 | 50 | 9906 | No transformation. |
| 4 | 5 hours | 1,200 | 50 | 9907 | No transformation. |
| 5 | 1 second | 1,600 | 56 | 9911 | No transformation. |
| 8 | 16 hours | 1,000 | 56 | 9912 | No transformation. |
| 9 | One-half hour | 1,000 | 73 | 9913 | Partial transformation. |
| 10 | 2 hours | 1,000 | 73 | 9915 | Complete transformation. |
| 11 | 17 hours | 800 | 78 | 9917 | Partial transformation. |
| 12 | 66 hours | 800 | 68 | 9921 | Partial transformation. |
| 13 | 55 minutes | 1,200 | 68 | 9923 | Complete transformation. |

It is noted that transformation can occur at as low a temperature as 800°C if sufficient time is permitted for the necessary incubation, nucleation, and crystal growth processes to take place. In conventional processes for manufacturing the cubic form of boron nitride, the temperatures range upward from about 1500°C. Thus, the use of aluminum as a catalyst is advantageous where the temperature is lowered into the 800°C range provided sufficient time is given for the transformation to be completed.

The grain structure of the resulting cubic boron nitride is polycrystalline and the crystals may vary from several hundred Angstroms up to several thousand Angstroms in dimension dependent upon the pressure and temperature used.

The following examples are illustrative of the invention.

EXAMPLE I

A powder of β-phase NiAl alloy was pressed into a slug of approximately 0.064 inch diameter and 0.075 inch length. The NiAl alloy had a composition of 47.09 atomic percent nickel and 52.91 atomic percent aluminum and contained approximately 11 vacant nickel sites in every hundred possible sites in the nickel sublattice. The slug was placed into a closely fitting boron nitride tube provided with boron nitride end caps. The tube was then placed into a tantalum heater tube which in turn was contained within a second (outer) closely-fitting boron nitride tube. The assembly was then inserted into a pyrophyllite tetrahedron having a 0.750 inch edge length and compressed in a tetrahedral anvil press having tungsten carbide anvils of 0.500 inch edge length, the press being similar to that described in U.S. Pat. No. 2,918,699. The sample was heated for 5 seconds at a pressure of 78 kilobars and temperature of 1,500°C after which the electric heating current was turned off, whereby effectively quenching the material to retain the high-pressure high-temperature state. On visual examination, portions of the boron nitride tube and end caps in contact with the β -NiAl alloy were found to have recrystallized. Examination of these recrystallized portions by the Debye-Scherrer X-ray powder diffraction method revealed that the graphite form of boron nitrdie had been converted directly to the cubic diamond (or zinc blende) form. The outer boron nitride tube underwent no conversion to the cubic form.

The outer boron nitride used to form the tube was of commercial grade material. The β -NiAl alloy was not melted in the process and it appeared that the conversion occurred entirely in the solid state.

EXAMPLE 2

In this Example the experimental arrangement was identical to that described in Example 1, except that the sample consisted of an intimate mixture of finely powdered β -NiAl alloys and finely powdered boron nitride in the ratio of 50/50 by weight. After the heat treatment under pressure as described in Example 1, the sample was found to consist of an intimate mixture of β -NiAl alloy and cubic boron nitride. Here again no conversion to the cubic form occurred in the boron nitride tube enclosing the tantalum heater, because it was not in contact with the catalyst.

EXAMPLE 3

In this Example the experimental arrangement was identical to that described in Example 1, except that the sample consisted of an intimate mixture of finely powdered phase β -NiAl alloy and finely powdered boron nitride in a weight ratio: 5 of β -NiAl to 95 of boron nitride. After the heat treatment under the pressure and temperature described in Example 1, the sample was found to consist of a dispersion of β -NiAl particles in a solid mass of polycrystalline cubic boron nitride. Here again no conversion to the cubic form occurred in the outer boron nitride tube enclosing the tantalum heater.

EXAMPLE 4

In this Example the experimental arrangement was identical to that described in Example 1, except that the sample consisted of an intimate mixture of finely powdered β -NiAl alloy and finely powdered boron nitride in the weight ratio: 0.5 of β -NiAl to 95.5 of boron nitride. After the heat treatment under pressure described in Example 1 the sample was found to consist of a dispersion of β -NiAl particles in a solid mass of polycrystalline cubic boron nitride.

In each of the above Examples the maximum pressure employed was 78 kilobars and the maximum temperature was 1,500°C. It is possible however to produce the cubic form at lower pressures and temperatures. Boron nitride in the cubic form may be produced from the graphitic form at a combined pressure and temperature of about 20 kilobars and 600°C and with a temperature rising with increasing pressure until at 100 kilobars the conversion may occur at approximately 3,000°C.

We claim:

1. A method for converting boron nitride from hexagonal form to cubic form comprising the steps of admixing at least 95% by weight of powdered hexagonal boron nitride with up to 5% by weight of at least one catalyst selected from the group consisting of aluminum and the β phase aluminum alloys Co-Al, Fe-Ni-Al, Co-Ni-Al, Co-Cu-Al, Cu-Ni-Al, Fe-Ni-Al, Cu-Co-Ni-Al and Fe-Co-Cu-Al which β -phase alloys contain lattice vacancies, compressing the mixture to a pressure of from 60 kilobars to about 85 kilobars, heating the mixture while at such pressure to a temperature of from about 800°C to about 1,600°C for a period of time sufficient to recrystallize the boron nitride.

2. The method of claim 1 in which the amount of boron nitride in the mixture is about 99.5 wt. percent.

3. The method of claim 2 in which the catalyst is 0.5 wt. percent elemental aluminum.

4. The method of claim 3 wherein the mixture is heated to a temperature of about 1,00°C.

5. The method of claim 1 wherein the mixture is compressed to a pressure of about 78 kilobars.

6. Method of claim 1 in which the particle size of the powders is within the range between 0.05 and 1.0 micron.

* * * * *